US011615332B2

(12) United States Patent
Williams et al.

(10) Patent No.: US 11,615,332 B2
(45) Date of Patent: Mar. 28, 2023

(54) TELEPHONE CALL ASSESSMENT USING ARTIFICIAL INTELLIGENCE

(71) Applicant: PAYPAL, INC., San Jose, CA (US)

(72) Inventors: David Williams, Aptos, CA (US); Dmitry Martyanov, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 946 days.

(21) Appl. No.: 16/451,372

(22) Filed: Jun. 25, 2019

(65) Prior Publication Data

US 2020/0410378 A1   Dec. 31, 2020

(51) Int. Cl.
*G06N 5/04* (2006.01)
*G06N 20/00* (2019.01)
*G06F 16/28* (2019.01)
*G06N 5/048* (2023.01)

(52) U.S. Cl.
CPC ........... *G06N 5/048* (2013.01); *G06F 16/285* (2019.01); *G06N 20/00* (2019.01)

(58) Field of Classification Search
None
See application file for complete search history.

(56) References Cited

U.S. PATENT DOCUMENTS

| 10,498,888 | B1* | 12/2019 | Rute | G06F 40/216 |
| 2007/0106580 | A1* | 5/2007 | Yang | G06Q 20/105 705/35 |
| 2016/0196615 | A1* | 7/2016 | Yen | G06Q 20/4016 705/30 |
| 2019/0005408 | A1* | 1/2019 | Tolpin | G06N 3/08 |
| 2020/0097545 | A1* | 3/2020 | Chatterjee | G06F 40/30 |

* cited by examiner

*Primary Examiner* — Daniel T Pellett
(74) *Attorney, Agent, or Firm* — Haynes and Boone, LLP

(57) ABSTRACT

Techniques are described relating to automatically classifying telephone calls into a particular category using machine learning and artificial intelligence technology. As one example, calls to a customer service phone number can be classified as related to prohibited activity, or as legitimate. In particular, a number of different telephony variables as well as additional variables can be used to make such a classification, after training an appropriate machine learning model. The training process may use an externally provided call classification score that is provide by an outside entity as an input, and can be calibrated so that the output score of the trained classifier provides a score that corresponds to a real-world percentage chance of an unclassified call falling into a particular category. Thus, a classifier score of "95" can indicate that a call is in fact believed to be 95% likely to correspond to prohibited activity, for example.

20 Claims, 5 Drawing Sheets

TELEPHONE CALL ASSESSMENT USING ARTIFICIAL INTELLIGENCE

TECHNICAL FIELD

This disclosure relates to improvements in machine learning and artificial intelligence technology, and more particularly to improvements in classifying telephone calls using particular advanced techniques, in various embodiments.

BACKGROUND

Telephone calls to a service center may be made for various reasons, some legitimate and some not legitimate. In particular, when a financial account is involved with a customer support call, there is a possibility that the caller is not legitimate but is instead engaged in prohibited activity (account takeover, identity theft, evasion of anti-money laundering rules or transaction risk assessment rules, etc.).

A customer service agent answering the call may be able to discern whether a call is legitimate during the course of interaction with the caller. Some examples would include whether a caller knows his or her social security number, identifying account information, or is able to provide a mailing address associated with the account.

It would be useful the agent, however, if additional information could be used to determine whether a particular call is at high risk of being illegitimate (i.e., whether the call is likely to fall into a particular category). Applicant recognizes that the ability to automatically assess the likelihood of a call falling into a particular category can be improved using particular machine learning and artificial intelligence techniques, as discussed below.

DETAILED DESCRIPTION

Techniques are described relating to using machine learning and artificial intelligence technology to automatically classify telephone calls into a particular category. As one example, calls to a customer service phone number can be classified as related to prohibited activity, or as legitimate. In particular, the present specification can use a number of different telephony variables as well as additional variables to make such a classification, after training an appropriate machine learning model. The training process may use an externally provided call classification score that is provide by an outside entity as one of its inputs, and can also be calibrated so that the output score of the trained classifier provides a score that corresponds to a real-world percentage chance of an unclassified call falling into a particular category. Thus, a classifier score of "95" can indicate that a call is in fact believed to be 95% likely to correspond to prohibited activity, for example.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
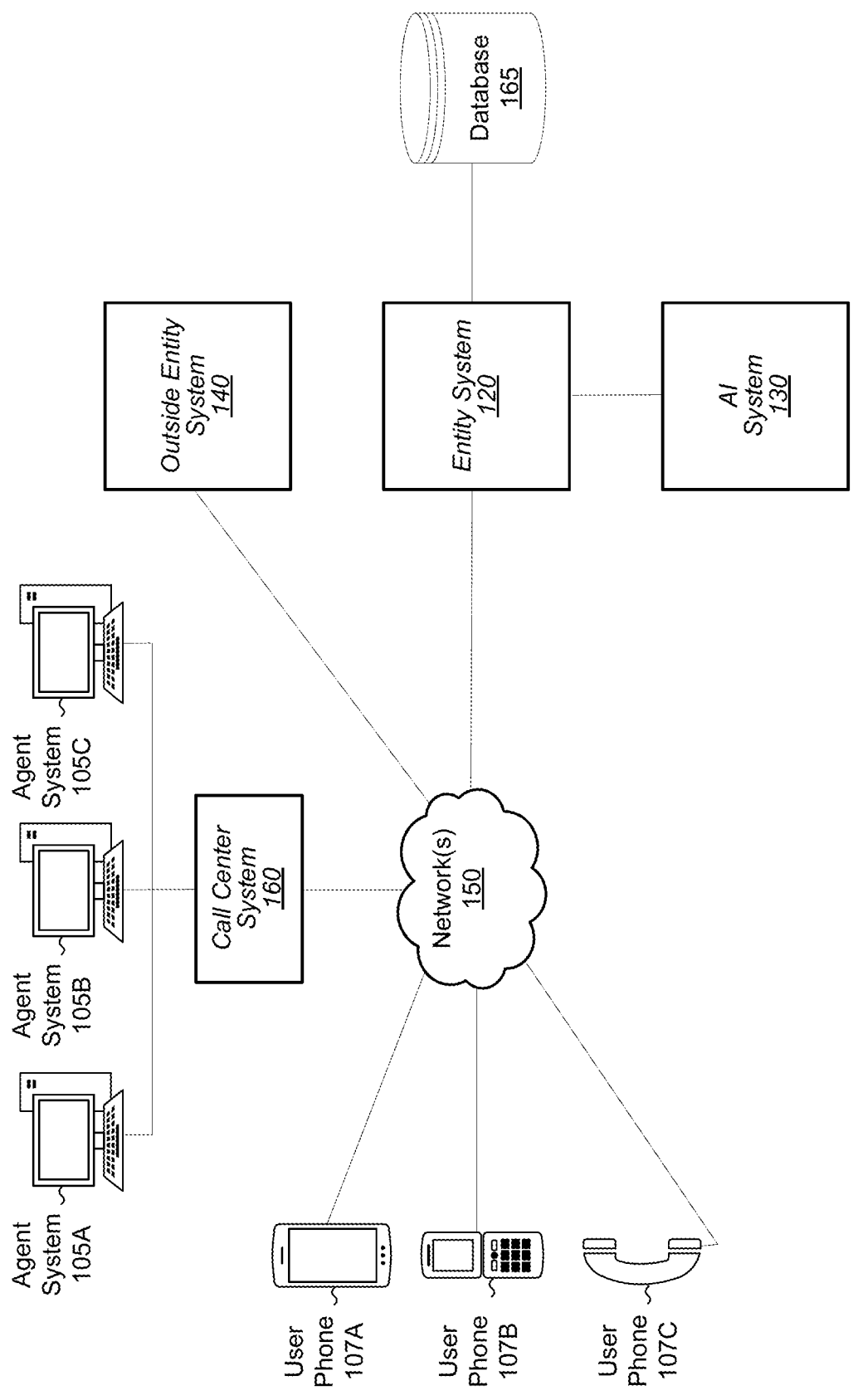
FIG. 1 illustrates a block diagram of a system, according to some embodiments.

Turning to FIG. 1, a block diagram of a system 100 is shown, according to various embodiments. In this diagram, system 100 includes agent systems 105A, 105B, and 105C and user phones 107A, 107B, and 107C. System 100 also includes entity system 120, outside system 130, AI system 140 (artificial intelligence system 140), database 165, and network(s) 150. The techniques described herein can be utilized in the environment of system 100, as well as numerous other types of environment.

Note that many other permutations of FIG. 1 are contemplated (as with all figures). While certain connections are shown (e.g. data link connections) between different components, in various embodiments, additional connections and/or components may exist that are not depicted. As will be appreciated by one of skill in the art, various devices may be omitted from this diagram for simplicity—thus, in various embodiments, routers, switches, load balancers, computing clusters, additional databases, servers, and firewalls, etc., may all be present and utilized. Components may be combined with one other and/or separated into one or more systems in this figure, as in other figures.

Agent systems 105A, 105B, and 105C ("agent systems 105") may be any computer system, according to various embodiments. These agent systems may be used for the purpose of interacting with users (e.g. customers). The agent systems may be able to display account information provided by entity system 120, and/or take various actions. Agent systems may be able to cause an account, such as an electronic transaction account, to be locked or unlocked, to require a user to provide step-up authentication details, place restrictions on an account (e.g. limiting transaction types or amounts), or take other actions. Call center system 160 may help coordinate calls between different agents and/or serve as a gateway interface to entity system 120.

Entity system 120 may facilitate access to one or more services, such as account access and electronic payment transactions (e.g. as may be provided by PayPal.com™). Entity system 120 may thus facilitate access to various electronic resources such as web pages, which can include an account, data, and various software programs/functionality, etc. A user may receive communications from entity system 120. Entity system 120 may be any computer system configured to provide access to electronic resources. This can include providing communications to users and/or web content, in various embodiments, as well as access to functionality provided a web client (or via other protocols, including but not limited to SSH, FTP, database and/or API connections, etc.). Services provided may include serving web pages (e.g. in response to a HTTP request) and/or providing an interface to functionality provided by another system and/or database 165.

Database 165 may include various data, such as user account data, system data, and any other information. Database 165 can include previous transactions (both successful and unsuccessful), for example, that are associated with an account. Multiple such databases may exist, of course, in various embodiments, and can be spread across one or more data centers, cloud computing services, etc. Additional databases may also be present even if not depicted. Entity system 120 may comprise one or more computing devices each having a processor and a memory. Network(s) 150 may include one or more networks comprising all or a portion of a telephone network and/or the Internet.

Entity server 120 may particularly correspond to an electronic payment transaction service such as that provided by PayPal™ in some embodiments, though in other embodiments, entity system 120 may correspond to different services and functionality. Entity system 120 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via entity system 120, including but not limited to stocks, commodities, gift cards, incentive points (e.g. from airlines or hotels), etc. Entity system 120 may also correspond to a system providing functionalities such as API access, a file server, or another type of service with user accounts in some embodiments.

Database 165 can include a transaction database having records related to various transactions taken by users of a transaction system in the embodiment shown. These records can include any number of details, such as any information related to a transaction or to an action taken by a user on a web page or an application installed on a computing device (e.g., the PayPal™ app on a smartphone). Many or all of the records in database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details. Such information may be used for bookkeeping purposes as well as for risk assessment (e.g. fraud and risk determinations can be made using historical data; such determinations may be made using systems and risk models not depicted in FIG. 1 for purposes of simplicity). As will be appreciated, there may be more than simply one database in system 100. Additional databases can include many types of different data beyond transactional data. Any description herein relative to database 165 may thus be applied to other (non-pictured) databases as well.

AI system 130 may also include one or more computing devices each having a memory and processor. In various embodiments, AI system 130 performs operations related to generating a machine learning model usable to categorize unclassified telephone calls made to a support agent who may be operating one of agent systems 105. AI system 130 may transmit information to and/or receive information from a number of systems, including database 165, entity system 120, outside entity system 140, as well as other systems, in various embodiments.

Figure 2:
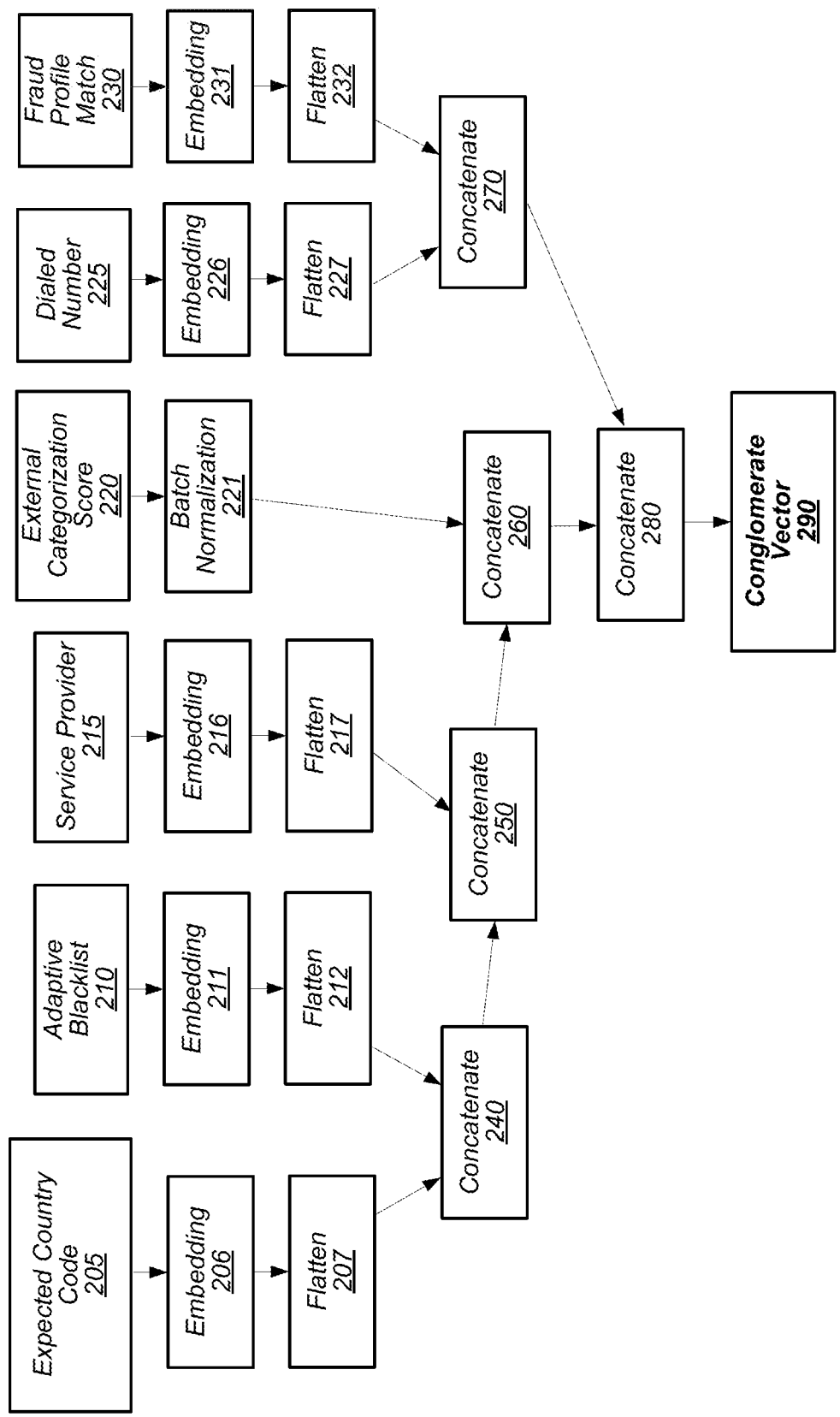
FIG. 2 illustrates a diagram of a representation of a telephone call-related data input flow usable to create a conglomerate vector, according to some embodiments.

Turning to FIG. 2, a diagram is shown of one representation of a telephone call-related data input flow usable to create a conglomerate vector, according to some embodiments. Multiple such conglomerate vectors can be used build a machine learning system that can accurately categorize an unclassified telephone call to a service center (e.g. a call that might be legitimate or might be fraudulent in nature). Note that the data used to create conglomerate vector 290 may be heterogenous in nature—some values may be Boolean (e.g. true or false), other values may be categorical (e.g. three or more different discrete values are possible), while yet other values may be numerical in nature (e.g. a score might be reported on a 0 to 100 scale, or a length of call duration might have a minimum value of 0.1 seconds and no specific maximum boundary). Concepts introduced relative to FIG. 2 (as well as FIG. 3) will be explained in further detail relative to other diagrams further below.

In FIG. 2, several input data are shown. Expected country code 205 is a country identifier that is expected to be associated with a phone call—for example, an international number beginning with "+33" means the phone call is expected to originate in France, or a number beginning with "+44" means the phone call is expected to originate in the United Kingdom, in one embodiment. Expected country code 205 is therefore an example of categorical data.

Expected country code data may be useful in identifying fraud if other data indicate that the phone call is not, in fact, originating from that country. In some embodiments, for example, audio analysis of background noise in a telephone call can indicate if the call is believed to come from a specific region or area. If this region does not match the expected country code for the call, this could be an indicator that prohibited activity is more likely than normal to occur on the call.

Adaptive blacklist 210 can indicate whether a particular caller phone number has been placed on a blacklist. The blacklist may contain numbers that have been associated with prohibited activity within a recent time period—e.g., if that telephone number was observed to have attempted account fraud within the last week, or some other time period, the number might be added to the blacklist. The adaptive blacklist can be a list that spans different entities—e.g. a telephone number used to attempt fraud against one service provider could be reported such that a second service provider can see the attempt via the list. Adaptive blacklist 210 is an example of Boolean input data, in some embodiments.

Service provider 215 is another categorical value. This can be an identifier of a service provider who is facilitating the user's phone call. Examples of service providers might include mobile telephone network operators such as T-Mobile™, Verizon™, or AT&T™. Other service providers can include internet telephony providers, such as Google Voice™ communications service. Some service providers may be more heavily associated with attempts to commit prohibited activity, in various embodiments. Note that these data may actually have more complex relationships that can be discovered through machine learning techniques than the simple correlations noted above.

External categorization score 220 is a numeric value in this example, and includes a call categorization score within a range (e.g. 0 to 100). This score may be provided by an external entity—for example, outside entity system 140 might provide this score to one of agents 105, to entity system 120, and/or to AI system 130. The call categorization score indicates the likelihood of a call falling into a particular category, in various embodiments. Thus, this score can indicate the perceived likelihood that a call will attempt to engage in activity prohibited by a service provider such as PayPal™. Note that this score is not necessarily a percentage but can simply be a raw score. Between a first call with a call categorization score of 80 out of 100 and a second call with a call categorization score of 95 out of 100, it may be more likely the second call will attempt a prohibited activity. But it does not necessarily indicate that the first call is "80% likely" to take prohibited action or that the second call is "95% likely" to take prohibited action.

External categorization score 220 is provided by a different model of an external entity, in some embodiments. This external model is not controlled or created by an entity that controls entity system 120 (e.g. PayPal™) in various embodiments.

Dialed number 225 is a categorical data item in various embodiments. A particular call center may service a number of different toll-free numbers, for example. One number may be for customers calling for a particular issue (e.g. trouble with a debit card) while another number might be for customers calling with another particular issue. The particular number that the user dials can thus also potentially indicate a higher or lower likelihood of prohibited activity, possibly in combination with other factors. Fraud profile match 230 is a Boolean value in the embodiment shown. This may indicate whether a particular caller is believed to match a previous fraud indicator (e.g. true or false). This could be based on a number of factors.

Note that many different data inputs may be used to create conglomerate vector 290, not just the six data inputs shown. In some embodiments, several dozen (or even more) data inputs can be used. This figure is shown with a smaller set of inputs for ease of understanding.

Once obtained, the data inputs can then be processed before being combined into conglomerate vector 290. Embedding steps 206, 211, 216, 226, and 231 can be used to place the corresponding Boolean or categorical data into vector space in such a way that the data is easier to use for machine learning (e.g. separating the data into different regions within the vector space). Batch normalization 221 can quantize numerical data as well into an appropriate vector space region. Concatenate operations 240, 250, 260, 270, and 280 can then be used to combine the processed data into a conglomerate vector 290.

Figure 3:
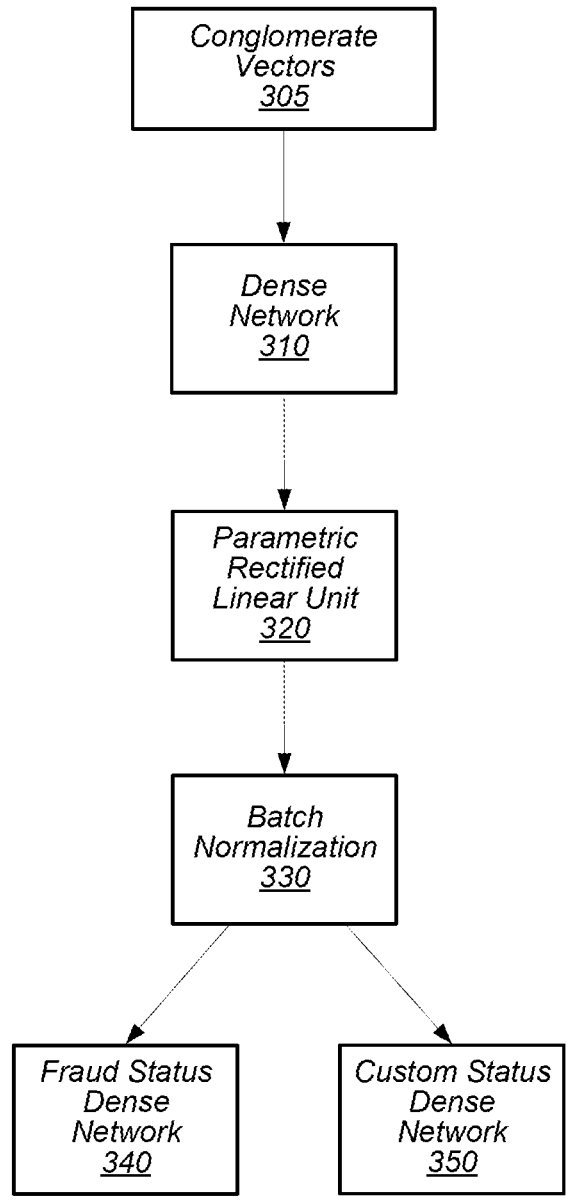
FIG. 3 illustrates a diagram of a high level representation of how multiple conglomerate vectors can be used to train a model related to telephone call classification, according to some embodiments.

Turning to FIG. 3, a diagram 300 is shown of a high level representation of how multiple conglomerate vectors can be used to train a model. In this instance, conglomerate vectors 305 (corresponding to a number of different phone calls) are fed into a first dense neural network 310. This network then outputs data to a parametric rectified linear unit 320, which in turn outputs to a batch normalization process 330. Outputs from the batch normalization are then provided to a fraud status dense neural network 340 and a custom status dense neural network 350. Neural network 340 is trained to output a score indicating whether or not a particular unclassified phone call relates to a prohibited activity. Neural network 350 meanwhile is trained to output a particular category of prohibited activity—such as account takeover, identity theft, or evasion of anti-money laundering rules. In the event the call is not believed to relate to prohibited activity, neural network 350 may output a null value (or some other value to indicate the call does not relate to a specific prohibited activity).

Figure 4:
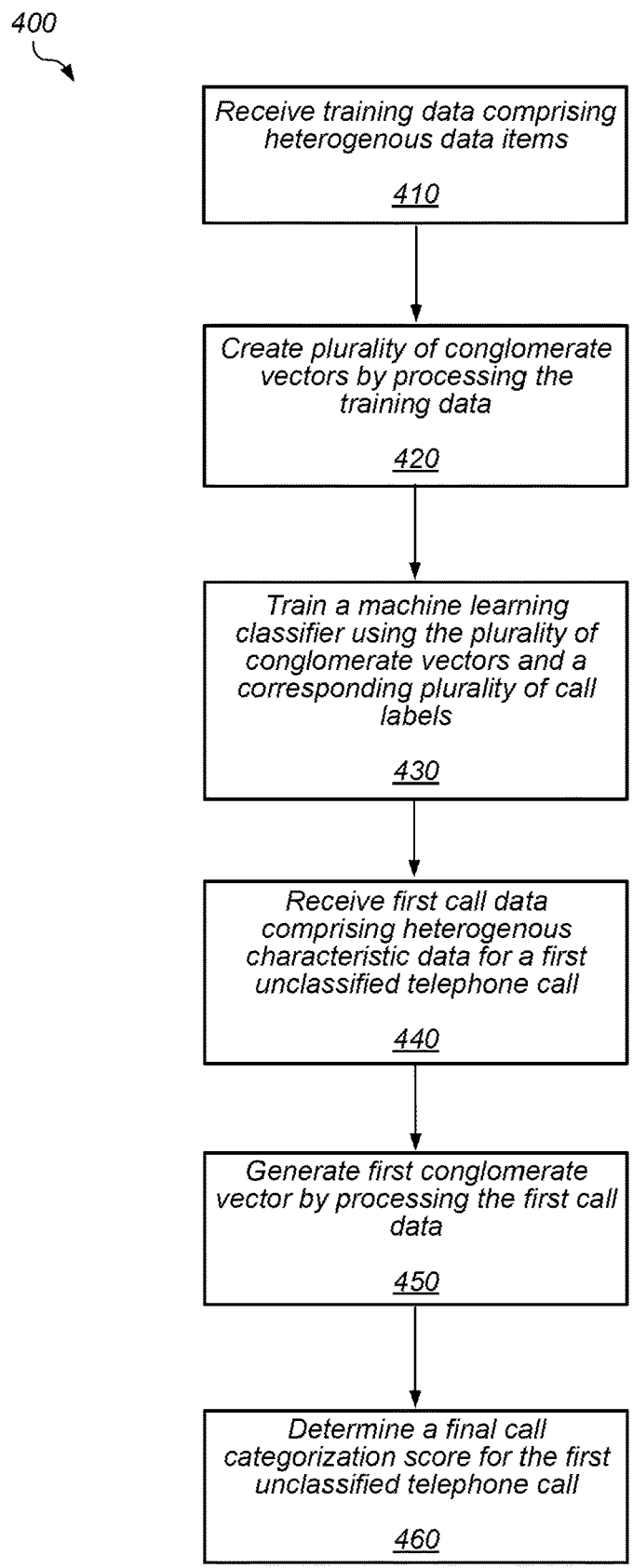
FIG. 4 illustrates a flowchart of a method relating to using machine learning to determine a telephone call categorization score, according to some embodiments.

Turning to FIG. 4, a flowchart of a method 400 relating to using machine learning to determine a telephone call categorization score, according to some embodiments.

Operations described relative to FIG. 4 may be performed, in various embodiments, by any suitable computer system and/or combination of computer systems, including AI system 130. For convenience and ease of explanation, operations described below will simply be discussed relative to AI system 130 rather than any other system, however. Further, various operations and elements of operations discussed below may be modified, omitted, and/or used in a different manner or different order than that indicated. Thus, in some embodiments, AI system 130 may perform one or more operations while another system might perform one or more other operations.

In operation 410, AI system 130 receives training data comprising a plurality of heterogenous data items for a plurality of previously classified telephone calls to an entity, according to various embodiments. These heterogenous data items can include one or more categorical data items, one or more numeric data items including a first call categorization score, and one or more Boolean data items.

This operation thus includes receiving various data about calls that have been already determined to be in a particular category (e.g. a legitimate call or a call engaged in prohibited activity). The calls are previously classified by expert humans, in some embodiments, to determine their categories. For example, customer agents of a call center may rate calls they experience after the call as either fraud/not fraud. Additional review can be undertaken if desired, including cross-indexing account & transaction information to customer support calls to determine if a previously made call was in a particular category. In this way, labels (used to enable machine learning) can be generated for a plurality of telephone calls to an entity such as PayPal™.

Secondary labels may also exist for a variety of calls. For calls that are deemed to relate to a prohibited activity (e.g. fraud), the secondary labels might include "account takeover", "identity theft", "social engineering", and "policy abuse". These labels may similarly by applied by human experts such as call agents, and/or using additional techniques. Some calls that relate to prohibited activity may also be unlabeled—that is, while a call is deemed to relate to fraud, it may be the case that a customer service agent handling the call did not assign a particular secondary label for the call. Thus each of a plurality of previously classified telephone calls can have a primary label relating to a primary call classification (e.g. whether or not a call relates to prohibited activity), while some but not all of the previously classified telephone calls may have a secondary label relating to the primary call classification (e.g. what specific kind of prohibited activity a user may have been attempting to engage in).

Additional data regarding phone calls—data that is included in a training set and/or for unclassified calls as well—can include a Boolean variable for an adaptive whitelist (the caller number was reported as being good/ confirmed to a legitimate user within a previous time period, by one or more entities, which do not necessarily include the entity being called). A detected call location can be a categorical variable—e.g. based on background audio analysis the call is believed to be from a particular country or region. The data can include a Boolean device type mismatch variable, for an indicator of whether a calling device appears to have an inconsistency (e.g. device purports to be a smartphone but appears to be a computer emulator instead). Call duration is a numeric data value e.g. measured in seconds and/or fractions of a seconds. Inactive number can be a Boolean data value that indicates whether a number is inactive (e.g. a service provider does not report the number as being actively in service). Phone type may be another categorical variable (e.g. mobile, landline, VOIP). The examples listed in FIG. 2 may also be data inputs, and numerous other additional inputs may be used as training data as well.

In some embodiments, account level data may also be used as training data for a plurality of phone calls. If a user is calling regarding a PayPal™ or other account, then it may be possible to use a large number of different account-related data in training (and later in unknown call classification). Account level data may include length of a time a user account has been open (e.g. measured in days). It may include an average number of electronic payment transactions conducted and/or attempted within a previous time period, such as one week, one month, one year, or other. Account data can include a number of successful logins and/or failed logins within a time period. It can include country and/or region associated with the account. Account data can include numerous transactional details, such as amounts for the last N number of transactions (where N is a positive integer), and countries involved in the last N number of transactions (e.g. if a user has bought from the UK, China, USA, and France in the last 10 transactions). Account data can include reasons for denial on any previous failed transactions (e.g. insufficient funds, fraud, expired credit card, etc.). This and other account-based data can also be included for any call with which a particular account is associated (e.g. the caller provided an account identifier during the call such as a username, social security number, email address, account number, etc.).

Another data type that can be used in the training data is interactive voice response ("IVR") data. This data can be collected at various stages of a phone call, but one type of IVR data is collected near the beginning of a call—e.g., an automated prompt may ask a user "in a few words, please tell us the reason why you are calling today." The user's response can then be recorded and associated with the phone call. The IVR data can be retained in audio format and/or in text format (e.g. after being run through a speech-to-text processor).

Thus, as described above each telephone call can have a variety of data associated with it. This data is heterogenous in various embodiments, in that some data is categorical (e.g. three or more categories), some is Boolean (e.g. true or false flags for a particular aspect), and some is numeric in nature. Synthesizing this data together in order to use it for machine learning can be difficult, but by transforming this data into conglomerate vectors, one or more neural networks can be trained as further described below.

In operation 420, AI system 130 creates creates a plurality of conglomerate vectors within a vector space by processing training data for each of a plurality of previously classified telephone calls, according to various embodiments. Each of these conglomerate vectors may correspond to a particular telephone call.

This operation therefore includes taking the training data from operation 410 and using it to create, for each previously classified phone call, a conglomerate vector that includes a quantity of various individual vectors within it, in various embodiments. Thus, the conglomerate vector may be a "vector of vectors."

A dialed number (the toll free number that a user called) can be represented as a particular vector within the vector space. This dialed number vector might be a first component vector in the conglomerate vector. Another data item, such as the first call categorization score (e.g. an assessment score provided by a third party model that may indicate fraud) can be a second component vector within the conglomerate vector. In some instances, a data item in the training data may also be split into multiple component vectors, if desired. For example, an international phone number from France might be in the form of "+33 5 99 99 99 99". The first portion (33) could be put into a first component vector relating to country code; the second portion (5) could be put into a second component vector relating to regions within France (in this case, the "5" indicates southwestern France). Another portion of the phone number can be used to derive whether the phone is a mobile phone or a landline telephone. In this example, the phone number could thus be split up into at least three different component vectors.

In the process of creating the conglomerate vectors (and/or the process of creating the training data), the different data items that are used may be normalized, embedded, flattened, etc., in order to standardize the data so that it can be effectively used for training a classifier such as a neural network-based classifier. Each classified telephone call may thus have a corresponding conglomerate vector having dozens of different component vectors.

In operation 430, AI system 130 trains a machine learning (ML) classifier using the plurality of conglomerate vectors and a corresponding plurality of call labels for the previously classified telephone calls, according to various embodiments. Each of these call labels may indicate a particular category already determined for a particular corresponding previously classified telephone call. This operation may include training dense neural network 310, fraud status dense neural network 340, and/or custom status dense neural network 350 in various embodiments.

A neural network may have a variety of different layers and neurons at each layer. In the training process, values for individual neurons may be varied repeatedly in order to achieve better classification results. In the case of the fraud status dense neural network 340, for example, neurons may be adjusted so that the outcome of the classifier matches the previously determined call classifications as closely as possible. Each conglomerate vector used in training has an associated label—e.g., that call is known to be in a particular category (legitimate call vs. prohibited activity, for example). If there are 10,000 such conglomerate vectors and labels, the training can involve adjusting one or more neurons and then evaluating how accurate the outcome of the network was. That is, if there were 7,000 legitimate calls and 3,000 fraudulent calls, how many of the 7,000 calls were predicted to be legitimate and how many of the 3,000 fraudulent calls were predicted to be fraudulent?

Likewise, the custom status dense neural network 350 can be similarly trained to output a reason for a prohibited activity attempted via a phone call. For calls classified as relating to prohibited activity (e.g. fraud) there may be an additional classification on the call—that the call relates to account takeover, identity theft, avoidance of risk or anti-money laundering rules, etc. Each of these secondary outcome labels may be trained individually and/or in combination. Consider the example with 3,000 fraudulent calls. It may be that 1,000 of these calls were related to account takeover, 600 calls were related to identity theft, and 500 were related to policy abuse (e.g. trying to get approval for a transaction of a high dollar amount that automated systems deem as too risky to allow for a particular user). The remaining 900 calls might be classified for another prohibited activity categories and/or not specifically labeled (not all fraudulent calls for example might get a specific secondary label assigned).

In operation 440, AI system 130 receives first call data comprising heterogenous characteristic data for a first unclassified telephone call, according to various embodiments. Similar to the training data, this characteristic data may include one or more categorical data items, one or more numeric data items including a first call categorization score, and one or more Boolean data items.

In some embodiments, this first call data is for a telephone call that has already been completed. A customer service agent may have already answered the phone call and finished the call, for example. In other embodiments, however, this first call data is for a telephone call that is still in progress—that is, this data may be received while a customer service agent is still in an active session with the caller. In some embodiments, the first call data may be received either for an already completed call or for a call that is still in progress.

In operation 450, AI system 130 generates a first conglomerate vector by processing the first call data, according to various embodiments. This first call data may be processed similarly to the training data in operation 420—various data items may be embedded, flattened, or otherwise manipulated to fit into the vector space in the same way that training data was processed. This same processing allows a trained classifier to operate on the conglomerate vector in a consistent manner.

In operation 460, AI system 130 determines a final call categorization score for the first unclassified telephone call using the trained ML classifier and the first conglomerate vector, according to various embodiments. This operation may include providing the conglomerate vector to trained neural network 340 and/or trained neural network 350. The outcome from trained neural network 340 is the final call categorization score, in one embodiment. This score may be on a scale from 0 to 100, in some embodiments, and may also be provided to a customer service agent who is engaged in an active session for a telephone call (e.g. so that the agent can use the score to help determine how to handle the call).

This 0-100 score may be calibrated such that it represents a real-world percentage chance that a particular phone call falls into a particular category. Thus, an output score of "95" from trained neural network 340 would indicate a 95% chance that the call relates to prohibited activity. Such a score is in contrast to the first call categorization score, in some embodiments, that is provided by an outside entity computer system. The first call categorization score can also range from 0 to 100, but this score may not be calibrated. Thus it may be unknown whether a first call categorization score of "80" represents a 25% chance, 60% chance, 80% chance, or some other chance that the call will engage in prohibited activity. Likewise, a first call categorization score of 100 also does not represent a 100% chance that a call will engage in prohibited activity, but may correspond to some lesser likelihood instead—indeed, the provider of the first call categorization score may simply not know the actual real-world likelihood at all. The final call categorization score output by neural network 340, however, may be specifically calibrated such that it can easily be relied upon by a human customer service agent.

Thus, validation and calibration may be performed by AI system 130 on the one or more classifiers trained via method 400, such as neural network 340 and neural network 350, according to various embodiments. Validating a trained ML classifier can include operations comprising accessing second training data comprising a plurality of heterogenous data items for a second plurality of previously classified telephone calls to the entity, wherein no telephone calls in the second plurality of previously classified telephone calls are in the plurality of previously classified telephone calls, and determining two or more of true positive rate, true negative rate, false positive rate, or false negative rate for the second plurality of previously classified telephone calls relative to the trained ML classifier. For a particular classification (e.g. prohibited activity), true positive can measure how many calls labeled in that category were correctly predicted by the trained classifier. True negative can measure how many calls labeled as not being in that category were correctly predicted. Likewise, false positive and false negative rates can measure how many labeled legitimate calls were predicated as prohibited activity, and how many labeled calls for prohibited activity were predicted as legitimate, respectively.

Validation can be performed on neural network 340 (e.g. categorization score) and/or neural network 350 (e.g. secondary characteristic). This process can be used to ensure that the outputs of those trained ML classifiers match real-world circumstances. It is much more useful to a customer service agent to see a score of "85" and know this means an 85% likelihood of fraud, for example, than to see a score of "85" and only know (for example) this means an unquantified higher fraud risk than other scores like 80 or 75.

As part of the validation process, thresholds within a trained ML classifier can be adjusted to accommodate desired false positive or false negative rates. It may be the case that an entity using AI system 130 wants to decrease false negatives at the expense of increased false positives, for example, depending on the relative perceived tradeoffs (e.g. it could be much more costly for a company to allow a fraudster to take an action on a user account than to inconvenience a few more users by having them have to perform a step-up authentication challenge and/or temporarily restricting their account in some way). Conversely, false positives can also be decreased at the expense of false negatives if that tradeoff is considered worth it.

In some embodiments, the final call categorization score is used by AI system 130 to cause a remedial action to be taken automatically without human intervention. These remedial actions may include terminating a telephone call, requiring the caller and/or an account holder to complete a step-up authentication challenge (e.g. verifying additional personal information and/or account details), placing the telephone call into a lower-priority call queue that will result in a longer than average wait time for the call to be answered by a human, locking an electronic payment account, and/or placing one or more restrictions on an electronic payment account (e.g. limiting transactions to certain countries, limiting an amount of transactions to $50 per transaction or some other monetary limit, limiting a number of transactions that can be conducted within a particular time period, etc.). Remedial actions may of course also be initiated by a customer service agent and/or other human individual associated with entity system 120 and/or call center system 160, according to various embodiments.

Feedback data can also be provided to an external entity by AI system 130 or another system, where the feedback data includes results of a trained ML classifier for a plurality of unclassified telephone calls including the first unclassified telephone call, according to some embodiments. Thus, outside entity system 140 (e.g. who provides the first call categorization score) can be given feedback data regarding performance of the classifier. This feedback data can include results of calls as judged by humans—e.g. whether a customer service agent labeled call as relating to a prohibited activity or not. The feedback data can also include the conglomerate vector (or a smaller portion thereof) for each of the calls. This feedback data could enable the outside entity system to tune and/or revise their own model that provides the first call categorization score.

Computer-Readable Medium

Figure 5:
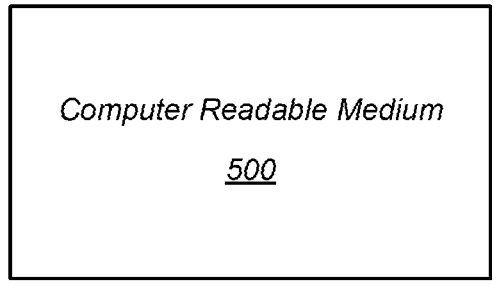
FIG. 5 is a diagram of a computer readable medium, according to some embodiments.

Turning to FIG. 5 a block diagram of one embodiment of a computer-readable medium 500 is shown. This computer-readable medium may store instructions corresponding to the operations of FIG. 4 and/or any techniques described herein. Thus, in one embodiment, instructions corresponding to AI system 130 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 6:
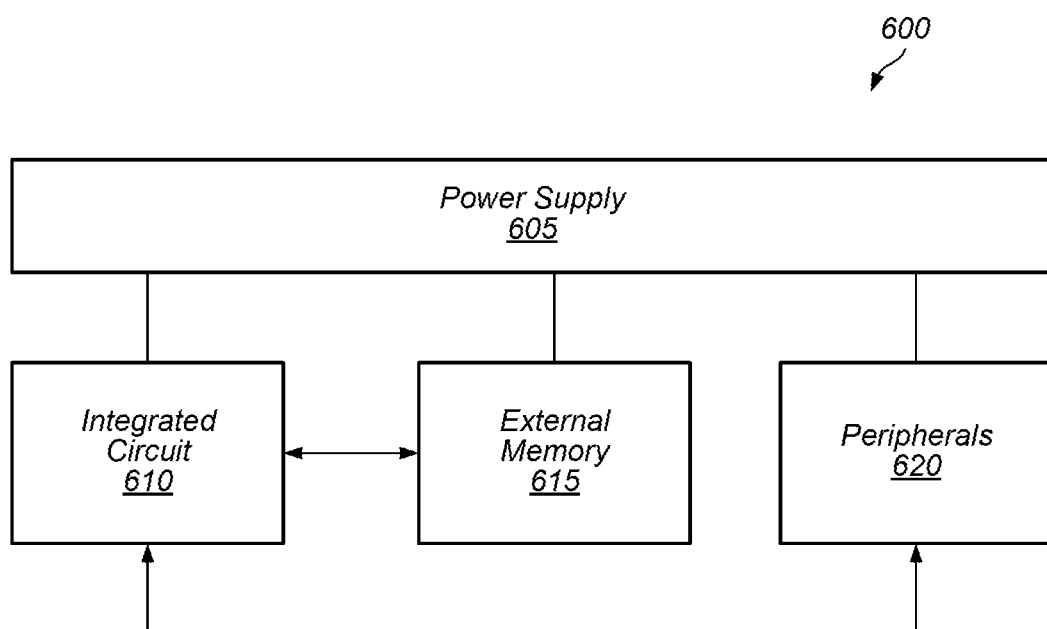
FIG. 6 is a block diagram of a system, according to some embodiments.

In FIG. 6, one embodiment of a computer system 600 is illustrated. Various embodiments of this system may be included in entity system 120, AI system 130, or any other computer system.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as Wi-fi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices. By way of further explanation, in some embodiments system 600 may include multiple computers or computing nodes that are configured to communicate together (e.g. computing cluster, server pool, cloud computing system, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving training data comprising a plurality of heterogenous data items for a plurality of previously classified telephone calls to an entity, wherein the heterogenous data items include one or more categorical data items, one or more numeric data items including a first call categorization score, and one or more Boolean data items;
creating a plurality of conglomerate vectors within a vector space by processing the training data for each of the previously classified telephone calls, each of the conglomerate vectors corresponding to a particular telephone call;

training a machine learning (ML) classifier using the plurality of conglomerate vectors and a corresponding plurality of call labels for the previously classified telephone calls, each of the call labels indicating a particular category already determined for a particular corresponding previously classified telephone call;

a first entity computer system receiving first call data comprising heterogenous characteristic data for a first unclassified telephone call, the characteristic data including one or more categorical data items, one or more numeric data items including a first call categorization score, and one or more Boolean data items;

the first entity computer system generating a first conglomerate vector for the first unclassified telephone call by processing the first call data; and using the trained ML classifier and the first conglomerate vector, the first entity computer system determining a final call categorization score for the first unclassified telephone call.

2. The method of claim 1, wherein each of the plurality of conglomerate vectors includes a plurality of component vectors, each of the component vectors corresponding to one of the heterogenous data items.

3. The method of claim 2, wherein for a particular one of the plurality of conglomerate vectors, two or more of its component vectors correspond to a particular heterogenous data items.

4. The method of claim 1, wherein the first call categorization score for each of the previously classified telephone calls is received from an external entity other than the first entity, wherein the first entity controls the first entity computer system.

5. The method of claim 4, further comprising:
providing feedback data to the external entity, wherein the feedback data comprises results of the trained ML classifier for a plurality of unclassified telephone calls including the first unclassified telephone call.

6. The method of claim 1, wherein each of the plurality of previously classified telephone calls has a primary label relating to a primary call classification, and some but not all of the previously classified telephone calls each has a secondary label relating to the primary call classification.

7. The method of claim 1, further comprising:
providing the final call categorization score to a customer service agent who is engaged in an active session for the first unclassified telephone call.

8. The method of claim 1, further comprising:
the first entity computer system causing a remedial action to be taken automatically without human intervention based on the final call categorization score.

9. The method of claim 8, wherein the remedial action includes at least one of terminating the first telephone call, requiring an account holder to complete a step-up authentication challenge, locking an account, or placing one or more restrictions on an account.

10. The method of claim 1, further comprising:
validating the trained ML classifier by performing operations comprising:
accessing second training data comprising a plurality of heterogenous data items for a second plurality of previously classified telephone calls to the entity, wherein no telephone calls in the second plurality of previously classified telephone calls are in the plurality of previously classified telephone calls; and determining two or more of true positive rate, true negative rate, false positive rate, or false negative rate for the second plurality of previously classified telephone calls relative to the trained ML classifier.

11. The method of claim 1, wherein the training data comprises account level data for a plurality of electronic transaction accounts associated with individual ones of the plurality of previously classified telephone calls.

12. The method of claim 11, wherein the first call data includes account level data comprising a plurality of previous monetary transactions for a particular electronic transaction account associated with the first unclassified telephone call.

13. A non-transitory computer-readable medium having stored thereon instructions that when executed by a computer system cause the computer system to perform operations comprising:
receiving training data comprising a plurality of heterogenous data items for a plurality of previously classified telephone calls to an entity, wherein the heterogenous data items include one or more categorical data items, one or more numeric data items including a first call categorization score, and one or more Boolean data items;
creating a plurality of conglomerate vectors within a vector space by processing the training data for each of the previously classified telephone calls, each of the conglomerate vectors corresponding to a particular telephone call;
training a machine learning (ML) classifier using the plurality of conglomerate vectors and a corresponding plurality of call labels for the previously classified telephone calls, each of the call labels indicating a particular category already determined for a particular corresponding previously classified telephone call;
receiving first call data comprising heterogenous characteristic data for a first unclassified telephone call, the characteristic data including one or more categorical data items, one or more numeric data items including a first call categorization score, and one or more Boolean data items;
generating a first conglomerate vector for the first unclassified telephone call by processing the first call data;
using the trained ML classifier and the first conglomerate vector, determining a final call categorization score for the first unclassified telephone call; and
providing the final call categorization score to an agent.

14. The non-transitory computer-readable medium of claim 13, wherein each of the plurality of conglomerate vectors includes a plurality of component vectors, each of the component vectors corresponding to one of the heterogenous data items.

15. The non-transitory computer-readable medium of claim 14, wherein for a particular one of the plurality of conglomerate vectors, two or more of its component vectors correspond to a particular heterogenous data items.

16. The non-transitory computer-readable medium of claim 13, wherein the operations further comprise causing a remedial action to be taken for an account associated with the first unclassified telephone call in response to an agent instruction provided from the agent.

17. A system, comprising:
a processor; and
a non-transitory computer-readable medium having stored thereon instructions that when executed cause the system to perform operations comprising:

receiving training data comprising a plurality of heterogenous data items for a plurality of previously classified telephone calls to an entity, wherein the heterogenous data items include one or more categorical data items, one or more numeric data items including a first call categorization score, and one or more Boolean data items;

creating a plurality of conglomerate vectors within a vector space by processing the training data for each of the previously classified telephone calls, each of the conglomerate vectors corresponding to a particular telephone call;

training a machine learning (ML) classifier using the plurality of conglomerate vectors and a corresponding plurality of call labels for the previously classified telephone calls, each of the call labels indicating a particular category already determined for a particular corresponding previously classified telephone call, wherein the ML classifier comprises a neural network classifier;

receiving first call data comprising heterogenous characteristic data for a first unclassified telephone call, the characteristic data including one or more categorical data items, one or more numeric data items including a first call categorization score, and one or more Boolean data items;

generating a first conglomerate vector for the first unclassified telephone call by processing the first call data;

using the trained ML classifier and the first conglomerate vector, determining a final call categorization score for the first unclassified telephone call; and providing the final call categorization score to an agent.

18. The system of claim 17, wherein each of the plurality of previously classified telephone calls has a primary label relating to a primary call classification, and some but not all of the previously classified telephone calls each has a secondary label relating to the primary call classification.

19. The system of claim 17, wherein the operations further comprise:

providing the final call categorization score to a customer service agent who is engaged in an active session for the first unclassified telephone call.

20. The system of claim 17, wherein the operations further comprise:

causing a remedial action to be taken automatically without human intervention based on the final call categorization score.

\* \* \* \* \*